Oct. 6, 1964   R. E. RISLEY ETAL   3,151,632
PIPE REPAIR CLAMP
Filed Aug. 17, 1960   4 Sheets-Sheet 2
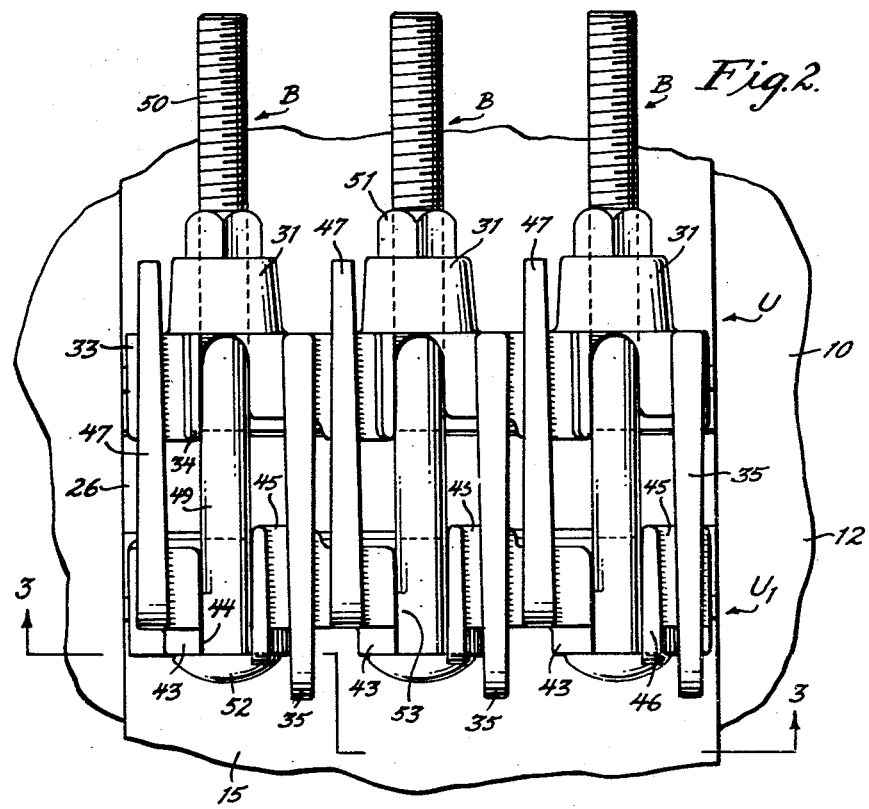
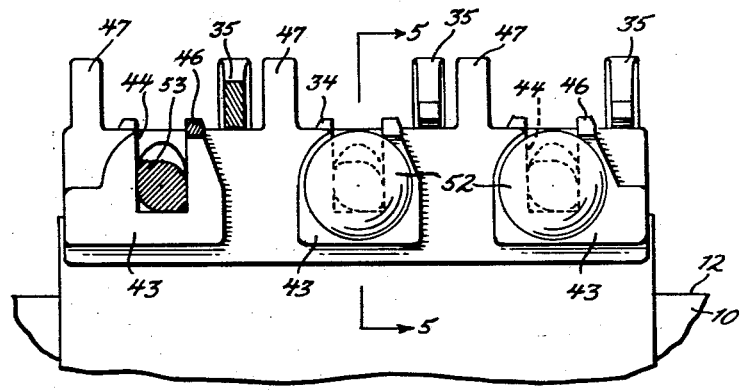
INVENTORS.
ROGER E. RISLEY
BY JAMES W. HALTERMAN
ATTORNEY.

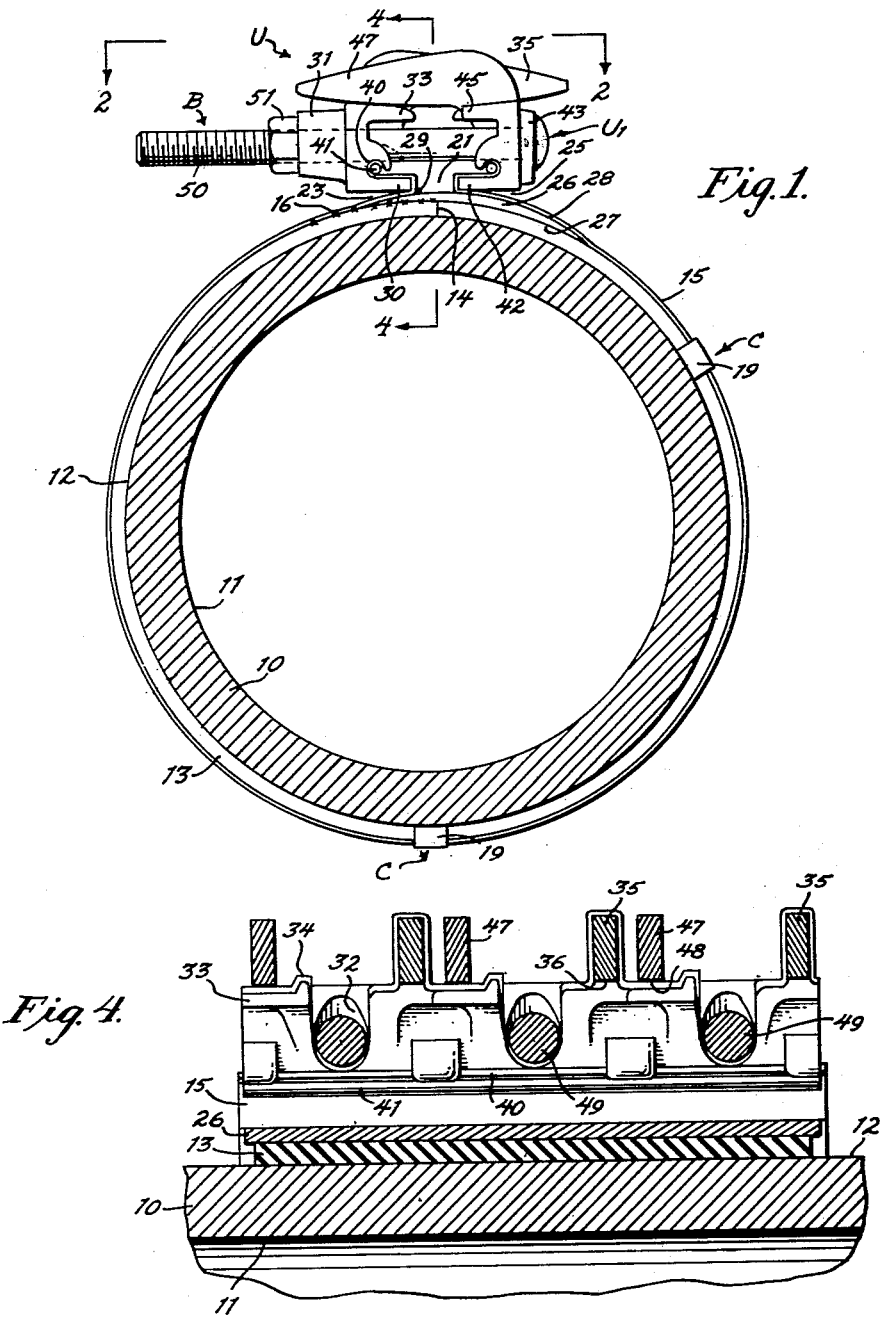

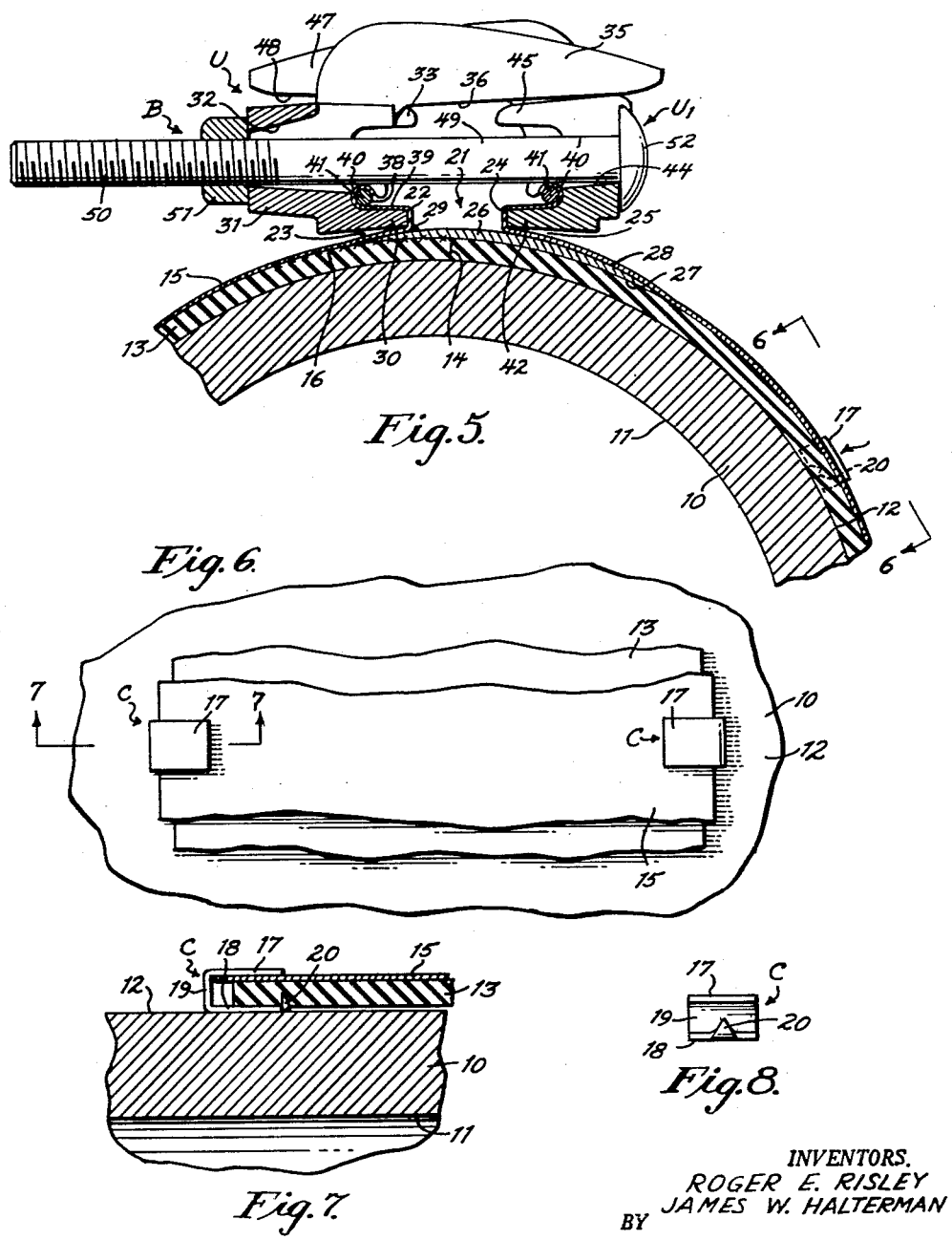

INVENTORS.
ROGER E. RISLEY
JAMES W. HALTERMAN
BY

ATTORNEY.

United States Patent Office 3,151,632
Patented Oct. 6, 1964

3,151,632
PIPE REPAIR CLAMP
Roger E. Risley, Bradford, Pa., and James W. Halterman, Salamanca, N.Y., assignors to Dresser Industries, Inc., Dallas, Tex., a corporation of Delaware
Filed Aug. 17, 1960, Ser. No. 50,253
6 Claims. (Cl. 138—99)

The present invention relates to pipe repair clamps and is concerned primarily with certain novel features which, among other advantages, enable the clamp to accommodate itself to variations in pipe size to a degree heretofore unattained.

A pipe repair clamp of the type with which this invention is concerned consists essentially of a sheet metal band which encircles the pipe to be repaired. This band has free ends which are in confronting relation at a gap and each of which is anchored to a lug assembly. Bolts pass through aligned openings in the respective lugs and the latter carry torque arms each of which has a bearing surface on the other lug. These torque arms and bearing surfaces prevent the lugs from rolling and maintain them in confronting parallel relation.

A gasket of rubber or a comparable elastomer material is disposed on the inner side of the band being interposed between the band and the pipe being repaired. It has been the practice to provide a spanner which bridges the gap in the band.

Pipe repair clamps, of the character aforesaid, are manufactured in various sizes to fit corresponding sized pipe. However, from the practical viewpoint the pipes vary in size from that specified to a fairly large degree and it is necessary that the clamp accommodate this discrepancy. It is, of course, a comparatively simple matter to make the gap substantially large to achieve this end. However, the same does not hold true for the gasket. From the practical viewpoint, it is considered desirable to attach the gasket to the band so as to facilitate positioning of the repair clamp about a pipe and because of this it has been the practice in most cases to bond the gasket to the band throughout the entire extent of the engaging surfaces. When this is done it has been necessary to employ some arrangement providing for the overlapping of the gasket ends and this has been proven to be not entirely satisfactory.

With the foregoing conditions in mind, the present invention has in view as a highly important objective, the provision of a pipe repair clamp of the character indicated in which the gasket has ends which meet in a butt joint with a substantial extent of the gasket being free of the band so as to be movable relative thereto. This relative movement which is provided between the gasket and the band enables the clamp to accommodate variations in pipe size within a wide range.

More in detail, the invention has as an object, the provision of a pipe repair clamp of the type noted in which at least 50% of the gasket extent is free of and unattached to the band. In a preferred embodiment of the invention, a comparatively narrow extent of the gasket is bonded to the band at one side of the gap as by using an adhesive. Such an arrangement affords a maximum extent of engaging surfaces which are free of and unattached to one another.

When the latter arrangment is employed it is, of course, necessary to employ means for maintaining the gasket assembled within the band to facilitate handling. Thus, another highly important object is to provide, in a pipe repair clamp of the character aforeside, U-shaped clips which are attached at the edges of the band and each of which has an outer arm overlying the band, slidable or movable therewith and an inner arm terminating in a pointed tang or end which is embedded in the rubber gasket. As many of these clips as required to maintain the assembled relation are employed and they do not impair the movable relation between the gasket and the band because of the fact that the outer arms of the clips are movable or slidable relative to the band.

It is important to note that the movable relation between the gasket and the band is intended primarily for use with a gasket having a butt joint. Moreover, this butt joint may take any of several shapes although the invention has particularly in mind the use of a simple butt joint in which the gasket has squared ends in abutting engagement.

Another highly important object of the invention is to provide, in a pipe repair clamp of the character indicated, an arcuate spanner that is secured to the band at one side of the gap as by welding and which spanner has inner and outer curved surfaces which gradually converge from the center of the spanner to the outer edges providing a spanner which has tapered or feathered edges. This structural feature is of importance because when it is employed the spanner does not materially divert the band from the circumferential direction it assumes in pipe encompassing position and thus makes it possible to maintain a uniform pressure on the gasket throughout its entire extend.

In many installations where these pipe repair clamps are utilized, it is highly practical to employ the conventional arrangement of forming the lug at one end of the gap with slots which open upwardly and which accommodate the headed ends of conventional bolts. However, in certain installations it is desirable to avoid this outward or radial movement of the headed ends of the bolts in positioning or removing the clamp. With this factor in mind, a further object of the invention is to provide, in a pipe repair clamp of the character aforesaid, a lug assembly in which one lug has the conventional circular openings for receiving the bolt shanks and the other lug is formed with a corresponding number of rectangularly shaped openings oblong in character and through which correspondingly shaped bolt heads are adapted to pass. The bolts having such heads also include necks which are designed to permit the rotation of the bolts through only 90°. Thus, with the two lugs spread apart and the bolts received in the openings in the first lug the heads may be passed through the oblong shaped openings of the second lugs and then turned 90° which brings the heads in holding position. Moreover, further rotation of the bolts is prevented so that the nuts may be tightened. Obviously the lug assemblies may be separated by a reverse operation.

Various other more detailed objects and advantages of the invention such as arise in connection with carrying out the above noted ideas in a practical embodiment will in part become apparent and in part be hereinafter stated as the description of the invention proceeds.

The invention, therefore, comprises a pipe repair clamp in which the gasket is free of attachment to the band throughout at least 50% of the engaging surfaces and has a butt joint. The gasket is maintained in assembled relation with respect to the band by U-shaped clips at the edges which do not interfere with the movement of the gasket relative to the band. A spanner is employed and is secured to the band at one side of the gap. This spanner has feathered edges which do not mar or impair the curvature of the band. A lug is secured to the band at each side of the gap and in one form of the invention, one lug has oblong shaped openings which accommodate bolt heads of the same shape with the bolts having necks that limit rotation of the bolts relative to the lug to 90°.

For a full and more complete understanding of the invention reference may be had to the following description and accompanying drawings wherein:

FIGURE 1 is a view taken as a transverse section through a pipe with a repair clamp of the invention applied thereto and shown in elevation.

FIGURE 2 is a detail taken on an enlarged scale as a top plan view of the lug assemblies. This view is taken about on the plane represented by the line 2—2 of FIGURE 1.

FIGURE 3 is another detail taken normal to the showing of FIGURE 2 and about on the plane 3—3 of FIGURE 2.

FIGURE 4 is another detail taken on an enlarged scale and as a central vertical section through the lug assembly being taken about on the plane represented by the line 4—4 of FIGURE 1.

FIGURE 5 is a detail section through a portion of the pipe repair band and lug assembly and is taken about on the plane represented by the line 5—5 of FIGURE 3.

FIGURE 6 is a detail plan of a portion of the band depicting the manner in which the gasket holding clips are applied at the side.

FIGURE 7 is a detailed section through the band at one of the clips being taken about on the plane represented by the line 7—7 of FIGURE 6.

FIGURE 8 is a detail end elevation of one of the clips.

Figure 9:
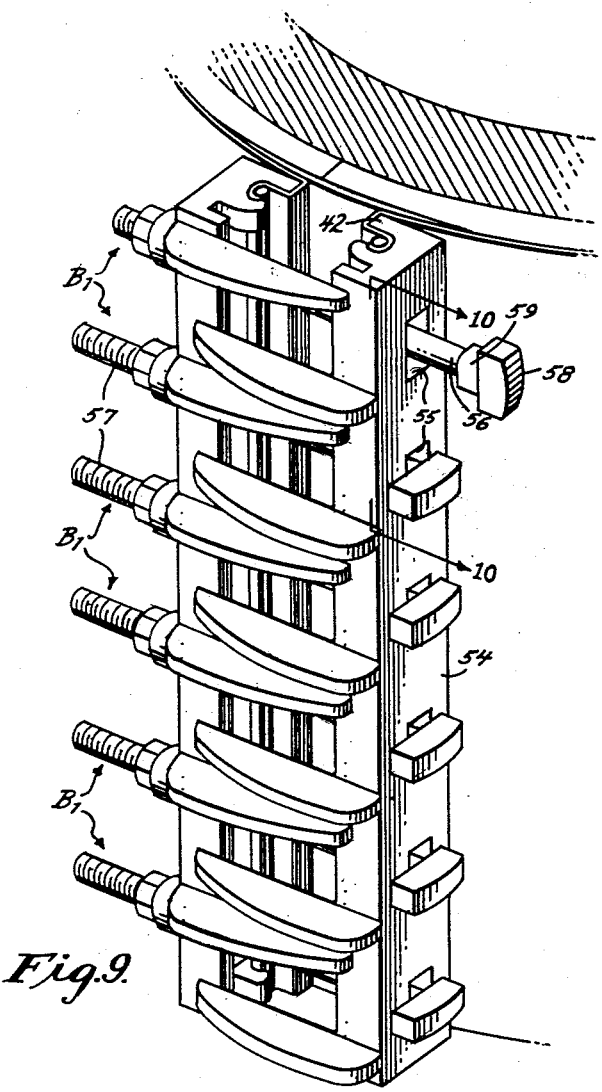
FIGURE 9 is a perspective of a modified form in which one lug has closed slots to accommodate oblong shaped bolt heads.

Referring now to the drawings wherein like reference characters denote corresponding parts, a pipe which is to be repaired is shown in section in FIGURE 1 and designated 10. The pipe 10 has a bore 11 and an outer surface 12. Engaging the outer surface 12 is a gasket 13 which is of rubber, rubber composition, or a comparable elastomer material. In the preferred embodiment of the invention the gasket 13 is provided in one piece having free ends which meet at a butt joint 14. This butt joint may take the form of the simple squared ends which abut one another such as shown in the drawing or may take other forms such as a tongue and groove or V. The important factor is that a butt joint be present so as to insure that the outer surface 12 is fully encompassed at the part of the break to be repaired and yet at the same time the elastic, yieldable, and compressible properties of the material from which the gasket 13 is made permits the latter to be tightly pressed against and around the surface 12 in snug and conforming engagement therewith.

It is also important to note that while in the drawing the butt joint 14 is shown as lying in the gap of the band to be later described this is not a limitation on the invention and this butt joint may be offset or disposed at one side of the gap.

A band designated 15 is made from an appropriate sheet metal having the required properties of flexibility and strength. Stainless steel is a good example of the material from which this band is made. The band 15 is disposed about the gasket 13 and the two are maintained in assembled relation by two factors. In the first instance a portion of the outer surface of the gasket 13 is bonded to the inner surface of the band 15, thus as by an adhesive. This bonded area is represented by the cross marked zone at 16. The second factor comprises a required number of clips, each of which is referred to in its entirety by the reference character C.

Referring now more particularly to the FIGURES 6, 7, and 8 each of the clips C is shown as being of U shape providing an outer leg 17, an inner leg 18 and a back 19. The clips C may be made from any appropriate material such as sheet metal, a flat wire, or even a wire of circular cross section. In any case the inner end of the inner arm 18 carries a pointed tang 20 which bites into the rubber gasket 13.

As shown in FIGURE 7 it is evident that the outer leg 17 is in sliding engagement with the outer surface of the band 15 while the inner leg is held immovable with respect to the gasket 13 by the pointed tang 20. However, the sliding engagement between the outer leg 17 and the band provides for relative movement between the gasket 13 and the band 15.

The clips C are preferably applied at the opposite side edges of the assembled gasket and band and as many as required may be employed. As shown in FIGURE 1 with the bonded area 16 being located at one side of the gap two pairs of the clips C spaced as illustrated are sufficient to maintain the assembled relation of the gasket and band during handling.

While it has been the practice in the field in which the present invention is made to utilize a two part band, the present invention in the preferred embodiment employs a one piece band and also uses a one piece gasket. This means there is but a single gap that is shown at 21. The gap 21 is defined by the turned back ends of the band 15. Thus, one end of the band 15 is turned back to provide a channel structure 22 that defines a groove 23. The other end is turned back as indicated at 24 to provide a channel or groove 25. In order to prevent the gasket 13 from bulging outwardly at the gap 21 as the band is tightened a spanner 26 is employed.

The spanner 26 is made of an appropriate material having required properties of strength and rigidity such as steel and is defined by an inner curved surface 27 which substantially conforms to the curvature of the outer surface of the gasket 13 with which it engages and outer curved surfaces 28 which merge together centrally of the spanner which is the thickest portion of the latter. Each of the outer curved surfaces 28 and the inner curved surfaces 27 converge outwardly from the center of the spanner to the ends thereof providing what is in effect a tapered or feathered construction in the spanner. Those portions of the band 15 immediately adjacent to the gap 21 conform to and assume the direction of the outer surfaces 28. Thus, any deviation from the true cylindrical contour of the pipe 10 and gasket 13 is held to a minimum.

As is more clearly illustrated in FIGURE 5 the spanner 26 is secured to the channel structure 22 at one side of the gap 21 as by welding indicated at 29. When this arrangement is employed a portion of the spanner underlies the band 15 at one side of the gap. When it is desired to have the bonded zone 16 at the same side of the gap it means that a portion of the gasket 13 is bonded directly to the spanner 26 and thus indirectly to the band 15. In other words, a portion of the bonded zone 16 is directly between the gasket and the band and the remaining portion between the gasket and the spanner.

A lug assembly comprises two lug units and the nuts and bolts which are operatively assembled therewith. One of these lug units is referred to in its entirety by the reference character U and the other U₁. The lug unit U includes a main body flange 30 which is received in the channel 23 of the structure 22. Carried by this main body flange 30, formed integrally therewith, and extending outwardly therefrom, that is away from the gap 21, are a plurality of lugs 31 each having a bolt opening 32. It will be understood that these repair clamps are provided in various sizes both diametric and longitudinal. The number of lugs 31 which are included in any particular unit U will depend on the longitudinal or axial extent of the clamp. In the form of the invention illustrated in the drawing, provision is made for accommodating three bolts. This means there are three of the lugs 31.

Formed as an integral part of the unit U and disposed substantially over the body flange 30 are three top wall sections 33. Each of these top wall sections 33 is located at one side of the axis of the respective bolt hole 32. It is important to note that the upper or outer surface of each of these top wall sections 33 is a bearing surface adapted to be engaged by a torque arm on the unit $U_1$ as will be later described and this bearing surface is substantially normal to a radius that is medial of the gap. At the side of each bearing surface more closely adjacent to the lug 31 there is a raised rib 34 which acts as a stop or guide for limiting movement of a torque arm on the unit $U_1$ as will be later described.

There is a top wall section at one side of each lug 31. On the other side of the same lug 31 and formed integrally with the unit U is a torque arm 35 which extends toward and over the unit $U_1$. Inasmuch as there are three lugs 31 there are three torque arms 35. Each of these torque arms 35 has a bottom edge 36 constituting a bearing surface which engages bearing surfaces on the unit $U_1$. The upper face of the body flange 30 terminates in a cylindrical recess 38 which extends throughout the length of the unit U. The channel structure 22 of the band 15 includes an outer wall 39 which terminates in a rounded bead 40 that is received in the recess 38. After the bead 40 has been so positioned a locking pin 41 is driven into the bead whereby that end of the band is securely anchored to the unit U.

The unit $U_1$ in many respects is similar to the unit U. Thus, it includes a main body flange 42 that corresponds to the flange 30 and which is received in the channel 25. That end of the band 15 is anchored to the unit $U_1$ in exactly the same manner as described above in connection with the unit U. Thus, a locking pin 41 is driven into the rounded bead 40 formed on the outer channel wall 39 of the channel 24.

Formed integrally with the main body flange 42 and extending outwardly therefrom are three lugs 43 each formed with a bolt slot 44. Obviously the bolt slots 44 in the unit $U_1$ align with the bolt holes 32 in the unit U. Formed integral with the unit $U_1$ and disposed at one side of each lug 43 is a top wall section 45 the upper surface of which constitutes a bearing surface which is engaged by the bearing surface 36 of one of the torque arms 35. At the side edge of each top wall section 45 adjacent to the bolt opening 44 is a raised rib 46 which constitutes a stop guide limiting lateral movement of the torque arm 35 which engages that particular bearing surface.

Also formed integrally with the unit $U_1$ are three torque arms 47, one being disposed on the side of each lug 43 opposite to that which is provided with the top bolt section 45. Like the torque arms 35, each of these torque arms 47 has a lower bearing surface 48 which engages the bearing surface of the sections 33 of the unit U.

In the form of invention disclosed in FIGURES 1 through 5, inclusive, conventional bolts B are employed. Each of the bolts B has a shank 49 which passes through a slot 44 and a bolt hole 32 aligned therewith. One end of the shank 49 is threaded as indicated at 50 and screwed onto this threaded end is a conventional nut 51 of noncircular formation such as a hex to permit a wrench engagement. The other end of each bolt B carries a conventional head 52 and immediately adjacent to this head 52 is formed an oval neck 53 that is received in the slot 44. The engagement of the oval shaped neck 53 with the side walls of the slot 44 holds the bolt against rotation and permits tightening of the nut 51.

Figure 10:
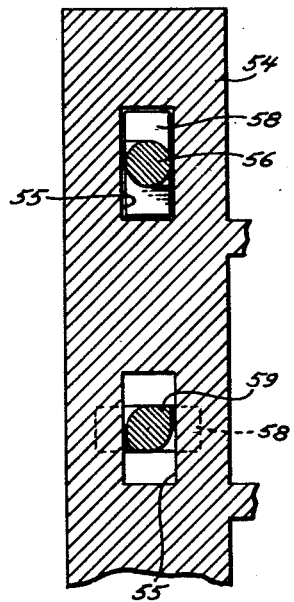
FIGURE 10 is a detail section taken about on the plane represented by the line 10—10 of FIGURE 9.
Figure 11:
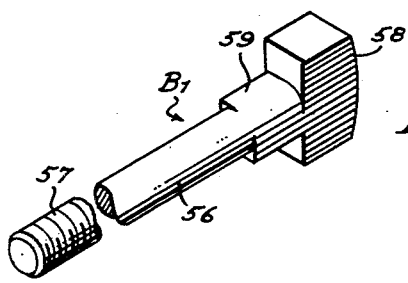
FIGURE 11 is a perspective of one of the bolts employed in FIGURE 9.

In the form of invention disclosed in FIGURES 9, 10, and 11 the lugs 43 of FIGURES 1 through 5 inclusive, are replaced by a continuous wall 54 that is integral with the flange 42 and which is formed with closed rectangularly shaped slots 55. The slots 55 are oblong in shape. Moreover, in the form of FIGURES 9 through 11, inclusive, the bolts B are replaced by bolts $B_1$, each having a shank 56, a threaded end 57, an oblong shaped head 58 dimensioned to pass through one of the slots 55 and a neck 59 immediately adjacent to the head 58 which is shaped to permit rotation of the bolt through only 90°.

When the form of FIGURES 9 through 11 is employed and when the lugs are separated the threaded ends of the bolts $B_1$ are first passed through the bolt holes 32 in the lug unit U. The heads 58 are then brought into accurate alignment with the slots 55 so that they pass therethrough until the necks 59 are positioned in the slots 55. The bolts are then rotated 90° to bring the heads into the position shown in FIGURE 9. The nuts 51 may now be tightened because the bolts are held against rotation by the necks 59.

Obviously when the lug units U are to be separated the heads 58 are brought into alignment with the slots 55 as depicted in the upper end of 59 and passed therethrough.

While preferred specific embodiments of the invention are hereinbefore set forth, it is to be clearly understood that the invention is not to be limited to the exact constructions, mechanisms, and devices illustrated and described because various modifications of these details may be provided in putting the invention into practice within the purview of the appended claims.

What is claimed is:

1. In a pipe repair clamp, a flexible pipe encircling band having confronting ends separated by a gap, a gasket of elastomeric material within said band having ends meeting in a butt joint, a portion of said gasket being bonded to said band at one side of said gap with at least 50% of said gasket and band being free and relatively movable with respect to one another.

2. In a pipe repair clamp, a flexible pipe encircling band having confronting ends separated by a gap, a gasket of elastomeric material within said band and having ends meeting at a butt joint positioned in the vicinity of said gap, a portion of said gasket being bonded to said band at one side of said gap with at least 50% of the engaging surfaces of said gasket and band being free and movable relative to one another, and means for drawing said confronting ends of the band together to clamp said gasket about a pipe to be repaired.

3. In a pipe repair clamp, a flexible pipe encircling band having confronting ends separated by a gap, a gasket of elastomeric material within said band and having ends meeting at a butt joint positioned in the vicinity of said gap, a portion of said gasket being bonded to said band at one side of said gap with at least 50% of the engaging surfaces of said gasket and band being free and movable relative to one another, means for maintaining the unattached portion of said gasket and band in assembled relation while permitting relative movement between the two, and means for drawing said confronting ends of the band together.

4. In a pipe repair clamp, a flexible pipe encircling band having confronting ends separated by a gap, a gasket of elastomeric material within said band and having ends meeting at a butt joint positioned in the vicinity of said gap, a portion of said gasket being bonded to said band at one side of said gap with at least 50% of the engaging surfaces of said gasket and band being free and movable relative to one another, and a pair of U-shaped clips each encompassing said band and gasket at one side of the unattached portion of the gasket and band permitting relative movement between the two, and means for drawing said confronting ends together.

5. In a pipe repair clamp, a flexible pipe encircling band having confronting ends separated by a gap, a gasket of elastomeric material within said band and having ends meeting at a butt joint positioned in the vicinity of said gap, a portion of said gasket being bonded to said band at one side of said gap with at least 50% of the engaging surfaces of said gasket and band being free and movable relative to one another, and a pair of U-shaped clips, one at each side of said band, each of said clips including an outer arm in sliding engagement with the outer surface of said band and an inner arm having a pointed tang embedded in the gasket, said clips being positioned at the unattached portions of said gasket and band, and means for drawing said confronting ends together.

6. In a pipe repair clamp, a flexible pipe encircling band having confronting ends separated by a gap, a full circle gasket of elastomeric material within said band having ends meeting in a butt joint positioned in the vicinity of said gap, said gasket being bonded to said band at one side of said gap with at least 50% of said surfaces of gasket and band being free and movable with respect to one another, means for maintaining the unattached portion of said gasket and band in assembled relation, a spanner bridging said gap and welded to said band at one side of said gap, said spanner having feathered edges interposed between said gasket and band, and means for drawing said confronting ends of the band together.

References Cited in the file of this patent

UNITED STATES PATENTS

| | | |
|---|---|---|
| 2,127,456 | Adams | Aug. 16, 1938 |
| 2,586,640 | Furman | Feb. 19, 1952 |
| 2,651,094 | Dodge | Sept. 8, 1953 |
| 2,690,193 | Smith | Sept. 28, 1954 |
| 2,897,568 | Hoke | Aug. 4, 1959 |
| 2,977,995 | Walpole | Apr. 4, 1961 |